(12) United States Patent
Kaminski et al.

(10) Patent No.: US 6,678,512 B1
(45) Date of Patent: Jan. 13, 2004

(54) RECEIVER SYSTEM USING ANALOG TO DIGITAL CONVERSION AT RADIO FREQUENCY AND METHOD

(75) Inventors: Walter Joseph Kaminski, Long Valley, NJ (US); Arild Kolsrud, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/548,995

(22) Filed: Apr. 14, 2000

(51) Int. Cl.[7] .................................................. H04B 1/16
(52) U.S. Cl. ...................... 455/334; 455/323; 375/136; 375/147; 375/316
(58) Field of Search .......................... 455/180.1, 188.1, 455/307, 552, 553, 323, 324, 334, 338–340; 375/136, 147, 335, 346–349, 316, 347, 355

(56) References Cited

U.S. PATENT DOCUMENTS

| | | | | |
|---|---|---|---|---|
| 5,280,636 A | * | 1/1994 | Kelley et al. | 455/3.02 |
| 5,570,352 A | * | 10/1996 | Poyhonen | 375/267 |
| 5,602,847 A | * | 2/1997 | Pagano et al. | 455/438 |
| 5,697,078 A | * | 12/1997 | Peterson et al. | 375/133 |
| 5,995,556 A | * | 11/1999 | Thomas, Jr. | 455/426 |
| 6,195,400 B1 | * | 2/2001 | Maeda | 370/331 |

FOREIGN PATENT DOCUMENTS

| EP | 2 338 853 A | 12/1999 | ............ H04B/1/26 |
|---|---|---|---|
| GB | 2338853 | 12/1999 | |
| GB | 2338853 A | * 12/1999 | ............ H04Q/7/32 |
| WO | WO 97 05705 | 2/1997 | |

OTHER PUBLICATIONS

"The Design of Flexible Receivers for Communicating Appliances", by Lawton, M.C. et al., *IEEE*, 7803–3157 pp. 1060–1064 (1996).

"CLC5526, CLC5956, and CLC5902 Diversity Receiver Chipset", *National Semiconductor Corporation*, Rev. 1.4, pp. 1–4 (Oct. 30, 1998).

"12–Bit, 65 MSPS IF Sampling A/D converter", *Analog Devices*, Norwood, MA, pp. 1–24 (1998).

* cited by examiner

*Primary Examiner*—William Trost
*Assistant Examiner*—James D Ewart (57) ABSTRACT

A receiver receives analog signals at radio frequency (RF), and the RF analog signals are converted into the digital domain. As such, the receiver does not require frequency conversion stage(s) prior to analog to digital conversion. For example, the receiver can comprise at least one antenna(s) which receives radio frequency (RF) analog signals at different frequency bands. The analog RF signals are provided to a single analog to digital (A/D) converter, and the A/D converter converts the analog RF signals at the different frequency bands into digital signals within the Nyquist bandwidth. By properly selecting the sampling rate of the A/D converter for the RF analog signals, the A/D converter can produce replicas of the different frequency bands of the analog signals in non-overlapping portions of the Nyquist bandwidth.

20 Claims, 5 Drawing Sheets

FIG. 5
NYQUIST ZONE FREQUENCY PLAN fs= 61.44    fs/2= 30.72

| Nyquist Zones (Frequency in 15 MHz bandwidths) | | | | | | | | | |
|---|---|---|---|---|---|---|---|---|---|
| 1 | 2 | 3 | 4 | 5 | 6 | 7 | 8 | 9 | 10 |
| 23.94 | 37.5 | 85.38 | 98.94 | 146.8 | 160.4 | 208.3 | 221.8 | 269.7 | 283.3 |
| 8.94 | 52.5 | 70.38 | 113.9 | 131.8 | 175.4 | 193.3 | 236.8 | 254.7 | 298.3 |

| Nyquist Zones (Frequency in 15 MHz bandwidths) | | | | | | | | | |
|---|---|---|---|---|---|---|---|---|---|
| 11 | 12 | 13 | 14 | 15 | 16 | 17 | 18 | 19 | 20 |
| 331.1 | 344.7 | 392.6 | 406.1 | 454 | 467.6 | 515.5 | 529 | 576.9 | 590.5 |
| 316.1 | 359.7 | 377.6 | 421.1 | 439 | 482.6 | 500.5 | 544 | 561.9 | 605.5 |

| Nyquist Zones (Frequency in 15 MHz bandwidths) | | | | | | | | | |
|---|---|---|---|---|---|---|---|---|---|
| 21 | 22 | 23 | 24 | 25 | 26 | 27 | 28 | 29 | 30 |
| 638.3 | 651.9 | 699.8 | 713.3 | 761.2 | 774.8 | 822.7 | 836.2 | 884.1 | 897.7 |
| 623.3 | 666.9 | 684.8 | 728.3 | 746.2 | 789.8 | 807.7 | 851.2 | 869.1 | 912.7 |

| Nyquist Zones (Frequency in 15 MHz bandwidths) | | | | | | | | | |
|---|---|---|---|---|---|---|---|---|---|
| 31 | 32 | 33 | 34 | 35 | 36 | 37 | 38 | 39 | 40 |
| 945.5 | 959.1 | 1007 | 1021 | 1068 | 1082 | 1130 | 1143 | 1191 | 1205 |
| 930.5 | 974.1 | 992 | 1036 | 1053 | 1097 | 1115 | 1158 | 1176 | 1220 |

| Nyquist Zones (Frequency in 15 MHz bandwidths) | | | | | | | | | |
|---|---|---|---|---|---|---|---|---|---|
| 41 | 42 | 43 | 44 | 45 | 46 | 47 | 48 | 49 | 50 |
| 1253 | 1266 | 1314 | 1328 | 1376 | 1389 | 1437 | 1451 | 1499 | 1512 |
| 1238 | 1281 | 1299 | 1343 | 1361 | 1404 | 1422 | 1466 | 1484 | 1527 |

| Nyquist Zones (Frequency in 15 MHz bandwidths) | | | | | | | | | |
|---|---|---|---|---|---|---|---|---|---|
| 51 | 52 | 53 | 54 | 55 | 56 | 57 | 58 | 59 | 60 |
| 1560 | 1574 | 1621 | 1635 | 1683 | 1696 | 1744 | 1758 | 1806 | 1819 |
| 1545 | 1589 | 1606 | 1650 | 1668 | 1711 | 1729 | 1773 | 1791 | 1834 |

| Nyquist Zones (Frequency in 15 MHz bandwidths) | | | | | | | | | |
|---|---|---|---|---|---|---|---|---|---|
| 61 | 62 | 63 | 64 | 65 | 66 | 67 | 68 | 69 | 70 |
| 1867 | 1881 | 1929 | 1942 | 1990 | 2004 | 2051 | 2065 | 2113 | 2126 |
| 1852 | 1896 | 1914 | 1957 | 1975 | 2019 | 2036 | 2080 | 2098 | 2141 |

FIG. 6

RECEIVER SYSTEM USING ANALOG TO DIGITAL CONVERSION AT RADIO FREQUENCY AND METHOD

BACKGROUND OF THE INVENTION

1. Field of the Invention

This invention relates to a wireless communications and, more particularly, to a receiver architecture in a wireless communications system using analog to digital conversion at radio frequency (RF).

2. Description of Related Art

The service area of a wireless communications system is partitioned into connected service domains known as cells, where wireless units communicate via radio links with a base station (BS) serving the cell. The base station is coupled to a land network, for example through a Mobile Switching Center (MSC) which is connected to a plurality of base stations dispersed throughout the service area. In the wireless communications industry, a service provider is often granted two or more non-contiguous or segregated frequency bands to be used for the wireless transmission and reception of RF communications channels. For example, in the United States, a base station for an "A" band provider for cellular communications receives frequency channels within the A (825–835 MHz), A' (845–846.5 MHz) and A" (824–825 MHz) bands, and the wireless units receive frequency channels within the A (870–880 MHz), A' (890–891.5 MHz) and A" (869–870 MHz) bands. A base station for a B band provider receives frequency channels within the B (835–845 MHz) and B' (846.5–849 MHz) frequency bands, and the wireless units receive frequency channels within the B (880–890 MHz) and B' (891.5–894 MHz) frequency bands. Additionally, a base station for a Personal Communications Systems (PCS) provider may receive frequency channels from wireless units on one or more PCS bands (1850 MHz–1910 MHz), and the wireless units receive frequency channels on one or more PCS bands (1930–1990 MHz).

In order to reduce system hardware costs, a service provider would want to use a common receiver for the simultaneous reception and processing of signals within the non-contiguous frequency bands. In a typical receiver architecture, a down-conversion stage for each frequency band is typically used to down-convert and to manipulate the placement of each frequency band at intermediate frequencies (IF) such that the frequency bands of the modulated analog signals are converted to a corresponding IF frequency spectrum and can be sampled at a reduced sampling rate by separate analog to digital (A/D) converters. To use a single A/D converter to digitize the modulated analog signals in the non-contiguous bands, a single A/D would have to sample at a high enough rate to encompass both frequency bands. This is an inefficient approach because the A/D converter is using bandwidth in sampling unwanted frequencies in the gap between the frequency bands. To reduce the frequency gap between non-contiguous frequency bands, a down-conversion stage for each of the frequency bands is used to down-convert and manipulate the placement of each frequency band at IF such that the bands are closer together to fit in a smaller Nyquist bandwidth. Another approach to improve the efficient use of the A/D converter bandwidth involves down-converting both frequency bands such that a replica of one of the frequency bands is positioned in the frequency gap between the frequency bands.

When the IF spectrum is sampled by an A/D converter at a sampling rate which is greater than or equal to twice the combined signal bandwidth, which can be referred to a the Nyquist sampling rate, the A/D input signal bandwidth rotates or folds periodically about itself at multiples of one-half the sampling frequency. As such, the signal bandwidth and mirror images of the signal bandwidth are periodically repeated at frequency intervals corresponding to the sampling rate of the A/D converter. Each replica of the signal bandwidth can be referred to as a Nyquist zone, and the IF signal bandwidth folds back to the first Nyquist zone between about 0 Hz and one-half the sampling frequency. The bandwidth of a Nyquist zone corresponds to the Nyquist bandwidth.

The periodicity of the spectral density in the digital domain is a basic property of sampled waveforms which can be predicted by determining the Fourier transform of the time-sampled waveform. Generally, the A/D converter samples at at least twice the bandwidth of the composite frequency bands (i.e. the Nyquist sampling rate) to obtain a digital representation of the modulated analog IF signal. Accordingly, the sampling rate for the A/D converter is chosen such that the Nyquist bandwidth encompasses the desired IF frequency bands. The higher the sampling rate, the wider is the Nyquist bandwidth. If the waveform is sampled at a rate less than twice its signal bandwidth (the Nyquist bandwidth), an undesirable overlapping between the adjacent periodic spectrums can occur—a well known phenomena known as aliasing. Accordingly, the sampling rate and the IF frequency are chosen such that the Nyquist bandwidth encompasses the frequency band to be converted while reducing the sampling rate of the A/D converter, enabling the use of lower sampling rate A/D converters with reduced cost. Accordingly, the wider the separation or frequency gap between the frequency bands, the current receiver architectures reach a point where the use of a single A/D is not viewed as practical or efficient.

If the frequency bands are far enough apart or if desired, a separate antenna is used for each segregated frequency band. In multiple antenna architectures where antennas are dedicated to different frequency bands, a separate branch is used in which a frequency conversion stage including a mixer and a local oscillator (LO) are used to down-convert the radio frequency (RF) analog signals to intermediate frequencies (IF), and an A/D is typically used for each antenna path. The above receiver architectures do not take advantage of the potential bandwidths and flexibility provided by the A/D converters in converting analog signals into the digital domain.

SUMMARY OF THE INVENTION

The present invention involves a receiver which receives analog signals at radio frequency (RF), and the RF analog signals are converted into the digital domain. As such, the receiver does not require frequency conversion stage(s) prior to analog to digital conversion. For example, the receiver can comprise at least one antenna(s) which receives radio frequency (RF) analog signals at different frequency bands. The analog RF signals are provided to a single analog to digital (A/D) converter, and the A/D converter converts the analog RF signals at the different frequency bands into digital signals within the Nyquist bandwidth. By properly selecting the sampling rate of the A/D converter for the RF analog signals, the A/D converter can produce replicas of the different frequency bands of the analog signals in non-overlapping portions of the Nyquist bandwidth.

BRIEF DESCRIPTION OF THE DRAWINGS

Other aspects and advantages of the present invention may become apparent upon reading the following detailed description and upon reference to the drawings in which.

DETAILED DESCRIPTION

Illustrative embodiments are described below of a receiver system using a single analog to digital (A/D) converter to convert RF analog signals into the digital domain. The RF analog signals are digitally converted using a sampling rate for the A/D converter which produces a replica of the signal bandwidth(s) at RF in the Nyquist bandwidth. As such, the receiver architecture according to the principles of the present invention does not require frequency conversion stage(s), which comprise mixer(s) and local oscillator(s), to down-convert the RF analog signals. Furthermore, by using a single A/D converter, the receiver provides time and/or phase coherent sampling of analog signals in different frequency band(s) in certain embodiments.

Figure 1:
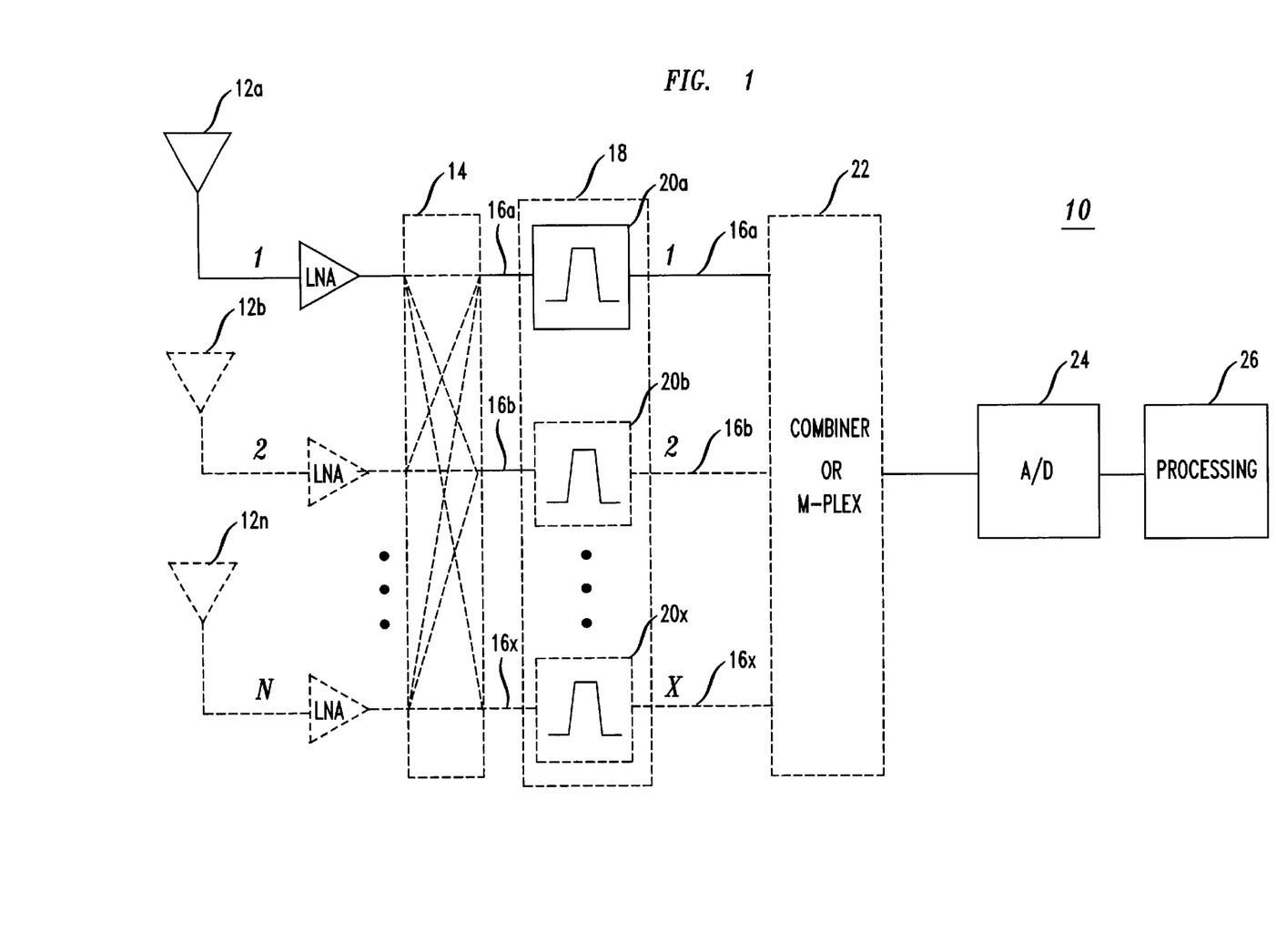
FIG. 1 shows a general block diagram of a receiver according to the principles of the present invention.

With particular reference to FIG. 1, a receiver 10 includes N antennas 12a–n which receive analog signals over RF communications channels, where N>=1. The antenna 12a could be a multiple frequency band antenna. A channel branch distributor 14, such as an N-plexer filter or combiner array, combines and/or separates the received RF analog signals or portions thereof and provides the received analog signals into X channel branches 16a–x in a desired manner, where X>=1 and can but need not be equal to N. For example, different channel branches 16a–x can carry the analog signals for corresponding RF frequency bands, the channel branches 16a–x can carry RF analog signals received by different antenna(s) or sets of antennas, and/or multiple channel branches having copies of the RF analog signals of different or contiguous frequency bands. In this embodiment, a filter arrangement 18 provides at least two different RF frequency bands on at least one channel branch 16a–x. For example, the filter arrangement 18 can include a filter 20a–x on each channel branch 16a–x which passes a frequency band on the respective channel branch 16a–x while attenuating other frequencies. Alternatively, depending on the embodiment, the channel branch distributor 14 can simply include direct connection(s) from the antenna(s) 12a–n to the filter arrangement 18, and the filter arrangement 18 can include a filter 20a–x for each channel branch 16a–x.

A combining arrangement 22 combines the RF analog signals on the channel branches 16a–x in desired fashion. The resulting composite analog signal is provided with analog signals in different frequency bands to an analog to digital converter 24 which digitizes the RF analog signals and provides the digitized signals to digital processing circuitry 26. Alternatively, depending on the embodiment, if the receiver 10 has a single branch 16, the combining arrangement 22 is simply a connection from the antenna 12 through the filter 20 (if required) to the A/D converter 24.

A sampling rate for the A/D converter 24 is selected such that the frequency bands of the RF analog signals on the channel branches 16a–x fold back to non-overlapping portions of the first Nyquist zone which reflects the Nyquist bandwidth provided by the analog to digital (A/D) converter 24. The Nyquist sampling rate for a modulated analog signal, for example where an information signal is modulated onto a carrier signal, can be defined as being at least twice the highest frequency component of the information signal regardless of the carrier frequency on which the information signal is modulated. The information, which can be voice, data, video, text and/or other information, is carried in the signal bandwidth. The highest frequency component of the information signal is directly related to the signal bandwidth. Because the signal bandwidth is sampled at at least twice the highest frequency component of the information signal, the information signal can be reproduced in the digital domain.

When the frequency spectrum is sampled by an A/D converter 24 at the sampling rate of at least twice the combined signal bandwidth, which can be referred to as the Nyquist sampling rate, the signal bandwidth rotates or folds periodically about itself at frequency multiples or intervals ("Nyquist zones") of one-half the sampling frequency back to a first Nyquist zone in the digital domain from 0 Hz to one-half the sampling rate. As such, a signal bandwidth and a mirror image of the signal bandwidth periodically repeats at frequency intervals corresponding to the sampling rate of the A/D converter. For example, a signal bandwidth in an odd-numbered Nyquist zone will appear in the same relative position in odd numbered Nyquist zones back to the first Nyquist zone yet appear as a mirror image in the even-numbered Nyquist zones. Moreover, a signal bandwidth in an even-numbered Nyquist zone appears as a mirror image in the odd-numbered Nyquist zones back to the first Nyquist zone while appearing in the same relative position in the even-numbered Nyquist zones. Therefore, replicas of the signal bandwidth(s) are repeated at intervals of one-half the sampling rate. The sampling rate for the A/D converter is chosen such that after the analog signals are digitized, the desired replica frequency bands occupy non-overlapping portions or channels of the first Nyquist zone. The digital conversion effectively preserves the information being produced at a rate of less than or equal to one-half the sampling rate in the bandwidth of the first Nyquist zone. If the sampling rate is increased, the first Nyquist zone or Nyquist bandwidth becomes wider.

In this embodiment, a fast Fourier transform (FFT) of the digital signal values provides signals at frequency bands ("Nyquist zone channels") within one-half the sampling rate ("the first Nyquist zone") representing the converted analog signals. If the waveform is sampled at a rate less than twice its signal bandwidth (the Nyquist bandwidth), an undesirable overlapping between the adjacent periodic spectrums can occur—a well known phenomena known as aliasing. Accordingly, the sampling rate is chosen to avoid loss of information due to aliasing.

Figure 2:
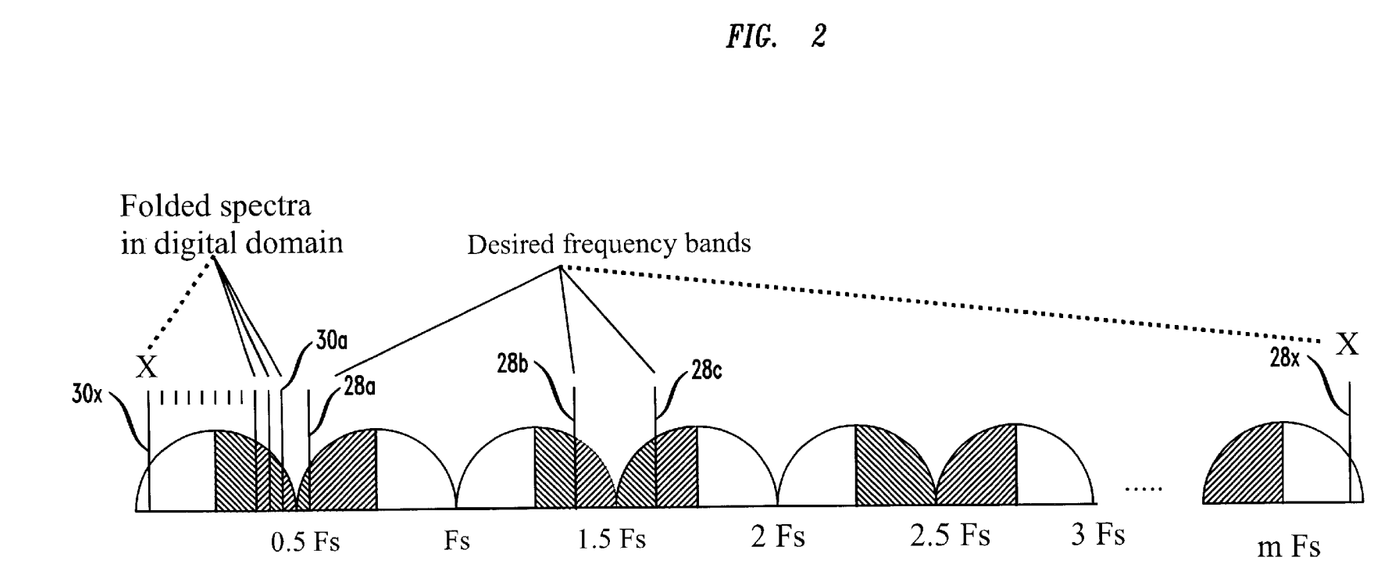
FIG. 2 shows the different frequency bands at the A/D input frequencies and the replicas of the analog signals in the different Nyquist zones which fold back to the first Nyquist zone in the digital domain.

For example, as shown in FIG. 2, in converting the analog signal at different RF bands into the digital domain, the A/D converter 24 processes the composite analog signal into Nyquist zone channels 30a–x or bands in the first Nyquist zone. The Nyquist zone channels 30a–x in the digital domain correspond to the different frequency bands 28a–x of the RF analog signals. The digital signal processing circuitry 26 can retrieve the digital signals from the Nyquist zone channels of the first Nyquist zone, because the different channels eventually end up in the first Nyquist zone after digitizing the analog input signals, for example using digital filters, digital combiners, digital detectors, digital demodulators, digital downconverters, such as a Digital Down Converter (DDC) with Numerical Controller Oscillator (NCO) to digitally down convert the data rate (which is referred to as decimation), and/or other digital processing. The DDC can tune to the respective frequencies for further signal processing. Therefore, the receiver 10 can use the bandwidth available in a single A/D to process the RF analog signals from different RF frequency bands.

As such, the receiver 10 according to the principles of the present invention eliminates the need for a mixer/LO combination on any of the channel branches 16a–x. A receiver 10 without a mixer/LO combination has many advantages. For example, without a fixed local oscillator (LO) in the frequency conversion stages, DC power consumption is reduced, re-radiation of LO out of the antenna is eliminated which reduces the need for extra front-end filtering, filter requirements at the IF are eliminated, and no image band filters are required. Because a mixer is not required, spurious mixer products as well as intermodulation distortion produced by the mixer are removed, thereby improving the spurious free dynamic range. Additionally, losses introduced by the mixer are removed which reduce the required channel gain and which improve the noise figure and the gain linearity. Furthermore, by using a single A/D converter, the receiver provides time and/or phase coherent sampling of analog signals in different frequency band(s). Different applications or signal processing schemes can benefit from such improved time and/or phase coherent measurements.

Figure 3:
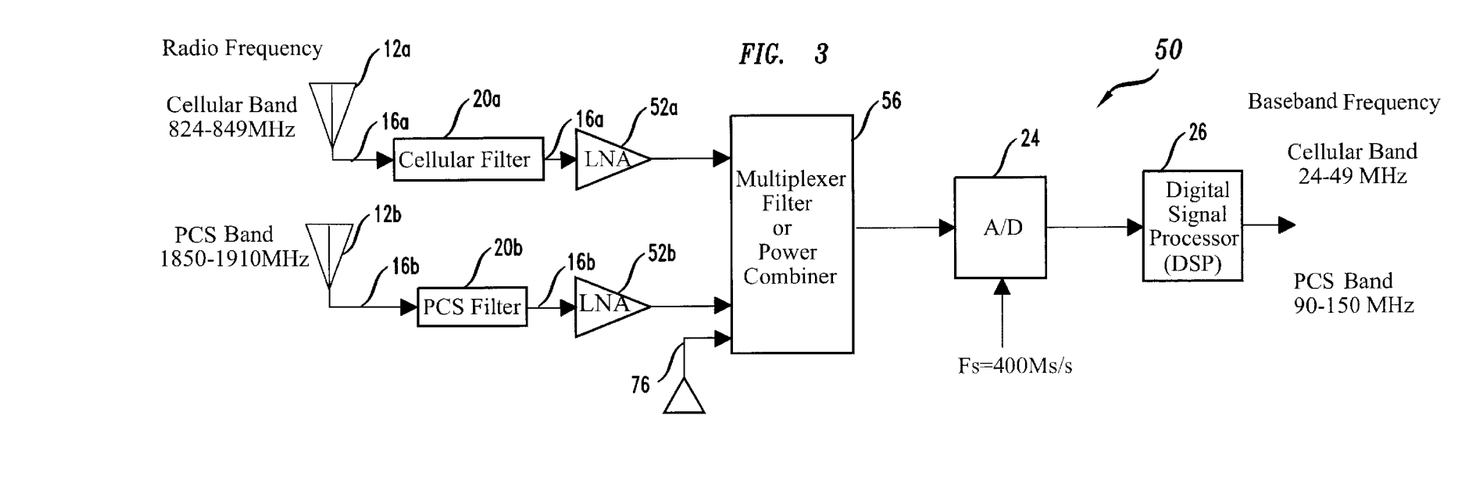
FIG. 3 shows a general block diagram of an example embodiment of a multiple band receiver according to principles of the present invention.

Depending on the embodiment and due to the flexibility of the receiver according to the principles of the present invention, the receiver can be implemented in different ways to use the potential bandwidth of an A/D converter 24. FIG. 3 shows an embodiment of a multiple band receiver 50 according to certain principles of the present invention which is used to receive communications signals in the cellular and the Personal Communications System (PCS) frequency bands. In the United States, a base station for a "A" band cellular service provider receives frequency channels within the A (825–835 MHz), A" (824–825 MHz) and A' (845–846.5 MHz) bands. A base station for a B band cellular service provider uses the B (835–845 MHz) and B' (846.5–849 MHz) frequency bands. In this example, a first antenna 12a receives the modulated analog signals within the entire cellular base station receive band (824–849 MHz), and a second antenna 12b receives the modulated analog signals in the entire PCS base station receive band (1850–1910 MHz).

In this embodiment, the RF analog signals from the antenna 12a are provided to a first channel branch 16a, and the RF analog signals from the antenna 12b are provided to a second channel branch 16b. A bandpass filter 20a on the first channel branch 16a passes the frequencies in the cellular band (824–849 MHz) and attenuates all other frequencies. A bandpass filter 20b on the second channel branch 16b passes the frequencies in the PCS band (1850–1910 MHz) and attenuates all other frequencies. In this embodiment, low noise amplifiers (LNAs) 52a–b amplify the analog signals on the respective channel branches 16a–b. A combining arrangement 56 receives the analog signals on the first and second channel branches 16a–b and provides the combined analog signals of the two different frequency bands to the A/D converter 24. The combining arrangement 56 can be a power combiner or a multiplexer filter.

In this example, the total bandwidth of the RF analog signals on the different branches 16a–b is 85 MHz after adding the cellular (25 MHz) and the PCS (60 MHz) bands. As such, a sampling rate for the A/D converter 24 is used such that the Nyquist bandwidth is sufficient to handle the 85 MHz bandwidth of the RF analog signals. Additionally, the sampling rate for the A/D converter 24 is selected such that the different frequency bands are replicated in non-overlapping portions of the Nyquist bandwidth. As such, the relative positioning of the different frequency bands within the respective Nyquist zone effects the choice of the sampling rate. For illustrative purposes, a 400 MHz sampling rate (400 Mega Samples per second) is used for the A/D converter 24 to provide a Nyquist zone bandwidth of 200 MHz (one-half the sampling rate). In practice, a different sampling rate may be selected to provide a different bandwidth or guard bands between the signals of the different frequency bands or branches. The A/D converter 24 samples the combined or composite analog signals in the cellular band (824–849 MHz) and in the PCS band (1850–1910 MHz). In doing so, the A/D converter 24 produces for the digital processing circuitry 26 converted signals in a Nyquist zone channel at 24–49 MHz corresponding to the signal bandwidth in the cellular band and converted signals in a Nyquist zone channel at 90–150 MHz corresponding to the signal bandwidth in the PCS band.

Figure 4:
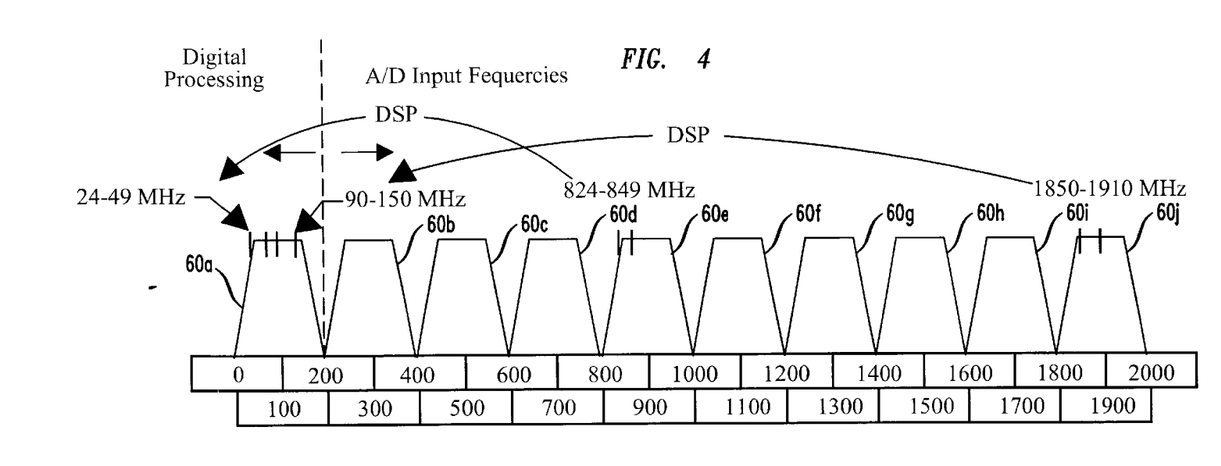
FIG. 4 shows the frequency bands at the A/D input frequencies and the replicas of the frequency bands at the digital domain frequencies of the first Nyquist zone for the multiple band receiver of FIG. 3.

FIG. 4 shows the frequency spectrum produced by the A/D converter 24 where Nyquist zones 60a–j are repeated across the frequency spectrum at intervals of the Nyquist bandwidth or 200 MHz. The cellular band appears in the fifth Nyquist zone 60e at the A/D input frequencies of 824–849 MHz which are the RF frequencies. A replica of the cellular band appears in each of the Nyquist zones back to the first Nyquist zone 60a which provides recovery of the information signal of the cellular band at a Nyquist zone channel between 24 and 49 MHz. The PCS band appears in the tenth Nyquist zone 60j at the A/D input frequencies of 1850–1910 MHz which are the RF frequencies. A replica of the PCS band appears in each of the Nyquist zones back to the first Nyquist zone 60a which provides recovery of the information signal of the PCS band at a Nyquist zone channel between 90 and 150 MHz corresponding to a mirror image of the 1850–1910 MHz A/D input frequencies.

By properly selecting the sampling rate for the A/D converter 24, the receiver according to the principles of the present invention can increase the utilization of the potential Nyquist bandwidth provided by the A/D converter 24 to receive RF analog signals in different frequency bands separated by large frequency differences. In the above example, the entire cellular and PCS bands were received and digitally converted using a single A/D converter using a sampling rate of 400 MHz. In sampling the analog signals at the RF frequencies, the A/D converter provides replicas or images of the RF frequency bands in the first Nyquist zone which are available for digital signal processing. In other embodiments, different sampling rates can be used to increase or decrease the Nyquist bandwidth, for example to provide extra bandwidth or guard bands between the signals of the different frequency bands.

Figure 5:
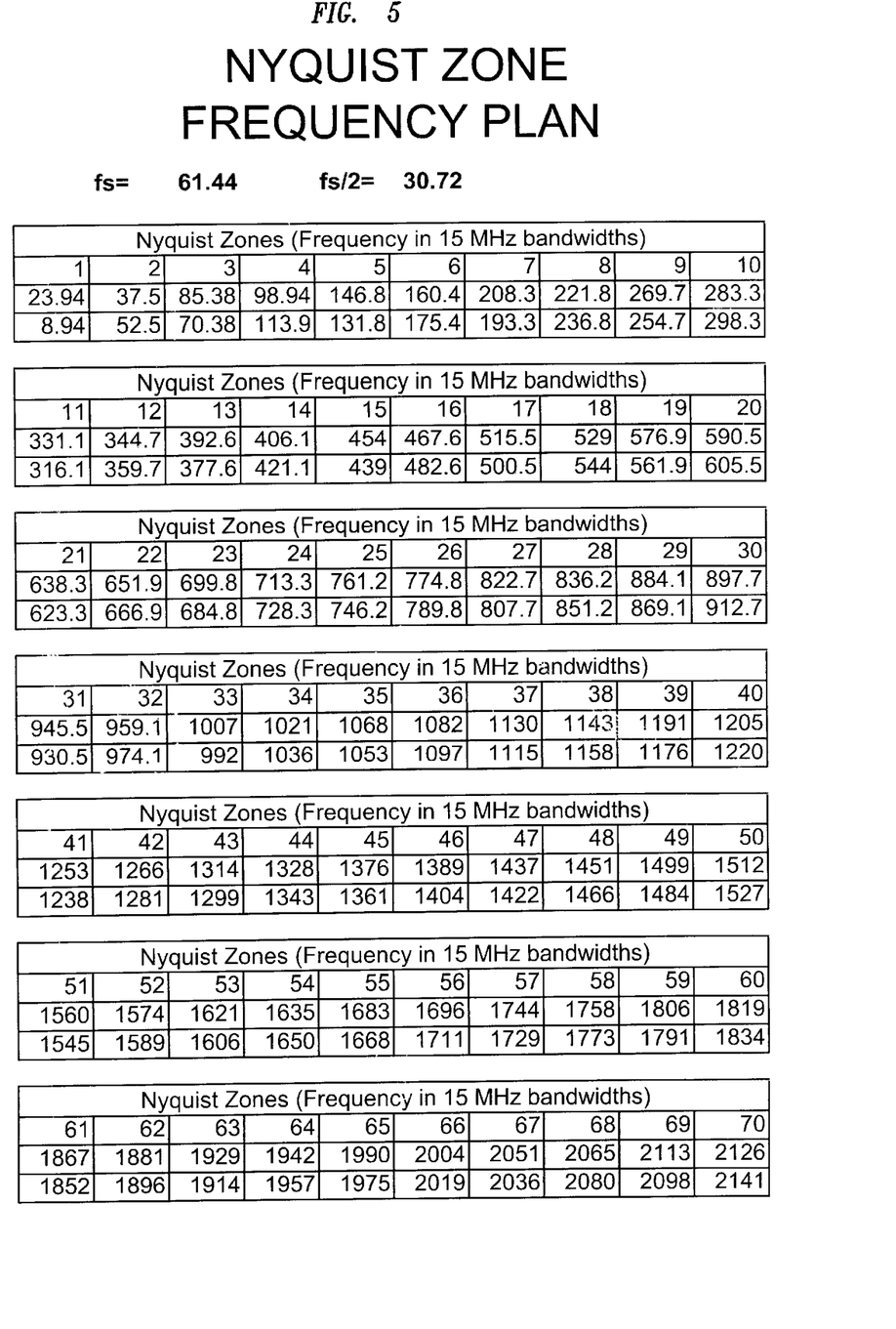
FIG. 5 shows a Nyquist zone frequency plan for an A/D converter using a sampling rate of 61.44 MHz.
Figure 6:
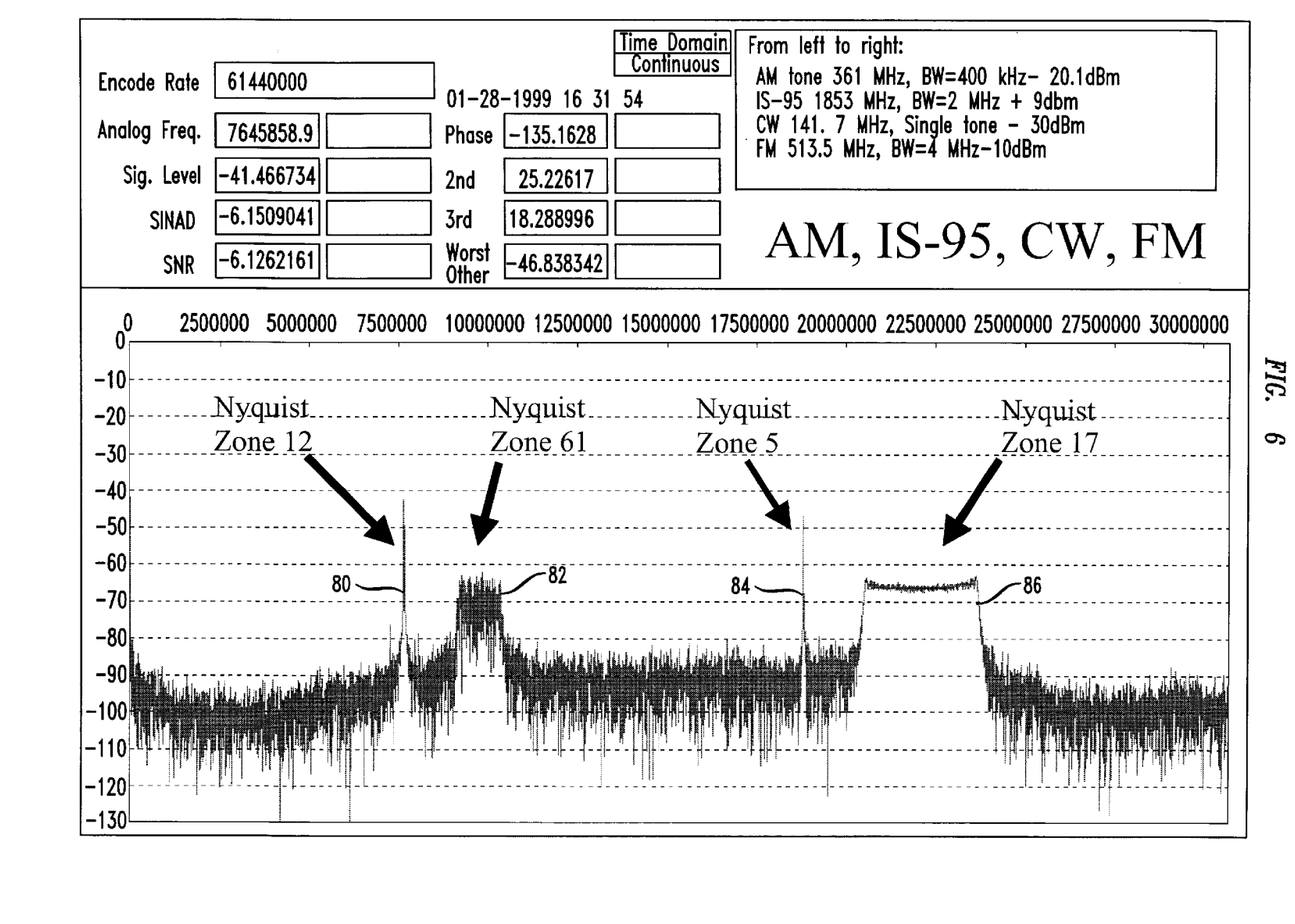
FIG. 6 shows Nyquist zone channels with replicas of the frequency bands at RF.

For example, FIG. 5 shows a Nyquist zone frequency plan for an A/D converter using a sampling rate of 61.44 MHz which provides Nyquist zones which are 30.72 MHz wide. The Nyquist zones are shown as 15 MHz bandwidths within each Nyquist zone as being in-band. FIG. 6 shows a first Nyquist zone that is 30.72 MHz wide in which replicas of signals in different frequency bands at higher Nyquist zones are shown in non-overlapping portions or channels of the first Nyquist zone. A first Nyquist zone channel 80 is shown at about 7.5 MHz with a replica of an amplitude modulated (AM) analog signal folded back from Nyquist zone 12 at 361 MHz with a 400 kHz bandwidth. A second Nyquist zone channel 82 is shown about 10 MHz with a replica of a code division multiple access (CDMA) signal folded back from Nyquist zone 61 at 1853 MHz with a 2 MHz bandwidth. A third Nyquist zone channel 84 is shown at about 18.75 MHz with a replica of a continuous wave (CW) single tone signal folded back from Nyquist zone 5 at 141.7 MHz. Finally, a fourth Nyquist zone channel 86 is shown at about 22 MHz with a replica of a frequency modulated (FM) signal folded back from Nyquist zone 17 at 513.5 MHz with a 4 MHz bandwidth. Accordingly, the receiver according to the principles of the present invention can receive and digitally convert analog signals from systems using different, the same or no multiple access techniques, using the same and/or different modulation techniques, and/or using different and/or contiguous frequency bands or schemes in a single A/D converter without frequency conversion of the RF frequency bands. The analog signals can be characterized as wideband, broadband and/or narrowband.

In addition to the embodiment described above, alternative configurations of the receiver architecture according to the principles of the present invention are possible which omit and/or add components and/or use variations or portions of the described receiver architecture. For example, with particular reference to FIG. 3, an AM broadcast radio frequency band (550–1600 kHz) can be received by an antenna 76 and added to the combined or composite analog signal, and the A/D converter 24 could digitize the analog signals in the AM radio frequency band. The AM radio frequency band would be located in the kilohertz range of the first Nyquist zone. As such, the receiver according to the principles of the present invention could receive signals from different sources, such as the base stations for cellular or PCS systems, AM or FM broadcast radio stations and/or GPS satellites. As would be understood by one of ordinary skill in the art, the various components making up the receiver architecture and their respective operating parameters and characteristics should be properly matched up to provide the proper operation. For example, an embodiment of the receiver system can be used to receive signals from a North American TDMA system, a Global System For Mobile Communication (GSM) system, a code division multiple access (CDMA) system, frequency division multiple access (FDMA) systems, Global Positioning System (GPS), FM radio and/or AM radio. Additionally, the embodiments of the receiver according to the principles of the present invention have been described with frequency band(s) associated with base station receive frequencies, but the receiver architecture according to the principles of the present invention can be used in wireless units, such as mobile units, receiving information from other frequency band(s), such as a base station transmit band which is a mobile unit receive band.

Furthermore, the receiver system has been described using particular configurations of distinct components, but it should be understood that the receiver system and portions thereof can be implemented in application specific integrated circuits, software-driven processing circuitry, firmware, programmable logic devices, hardware or other arrangements of discrete components as would be understood by one of ordinary skill in the art with the benefit of this disclosure. Although in the illustrative embodiment is shown with a particular circuitry, the measurement radio architecture can use different components which together perform similar functions when compared to the circuitry shown. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of processing received signals, comprising:
   providing, without requiring frequency conversion or down-conversion to RF, analog signals at different RF frequency bands on a plurality of channel branches;
   combining said analog signals at said different RF frequency bands on said plurality of branches; and
   digitally converting said analog signals at said different RF frequency bands at a selected sampling rate to produce digital signals at different frequency bands,
   said sampling rate selected so that said different frequency bands of said analog signals fold back to substantially non-overlapping portions of a Nyquist zone as said analog signals are digitally converted.

2. The method of claim 1 further comprising:
   receiving said analog signals on at least two antennas.

3. The method of claim 2, wherein said providing further includes:
   using a first antenna to provide analog signals of a first frequency band on a first channel branch; and
   using a second antenna to provide analog signals of a second frequency band on a second channel branch.

4. The method of claim 1, wherein said providing further includes:
   filtering on each channel branch said analog signals to provide analog signals having a frequency band corresponding to said channel branch.

5. The method of claim 1, wherein said providing further includes: receiving analog signals from at least one antenna; and
   selectively producing, on each channel branch, analog signals having a frequency band corresponding to said channel branch.

6. The method of claim 1, wherein said digitally converting of said analog signals at said different RF frequency bands is performed at a sampling rate selected so that a signal bandwidth of said combined analog signals and a mirror image of said signal bandwidth periodically repeats at frequency intervals corresponding to said selected sampling rate.

7. A receiver, comprising:
   at least one antenna for receiving analog signals in different radio frequency (RF) frequency bands;
   a channel branch arrangement connected to said at least one antenna for receiving analog signals and providing, without requiring frequency conversion or down-conversion to RF, analog signals onto a plurality of channel branches at different RF bands;
   a combining arrangement connected to said plurality of channel branches for combining said analog signals on said plurality of channel branches; and an analog to digital converter configured to receive and digitally convert said analog signals at said different RF bands to produce digital signals at different frequencies.

8. The receiver of claim 7, including at least two antennas for providing said channel branch arrangement with said analog signals.

9. The receiver of claim 8, wherein said channel branch arrangement is configured to provide, on a first channel branch, analog signals from a first antenna of a first frequency band, and to provide, on a second channel branch, analog signals from a second antenna of a second frequency band.

10. The method of claim 1, wherein said digitally converting of said analog signals at said different RF frequency bands is performed at a sampling rate selected so that said different RF frequency bands fold back to substantially non-overlapping portions of a Nyquist zone as said analog signals are digitally converted.

11. The method of claim 10, wherein said non-overlapping portions of said Nyquist zone represent the Nyquist bandwidth provided by said digitally converting to reproduce said RF analog signals in the digital domain.

12. The method of claim 10, wherein said selected sampling rate is at least twice a signal bandwidth of said combined analog signals, so that said signal bandwidth rotates periodically about itself at frequency multiples of one-half said selected sampling frequency back to a first Nyquist zone in the digital domain from about 0 Hz to said selected sampling rate.

13. The method of claim 12, wherein said selected sampling rate is at least twice a highest frequency component of said signal bandwidth so that information within said analog signals carried by said signal bandwidth are reproduced in the digital domain.

14. The method of claim 10, wherein said selected sampling rate is at least twice the signal bandwidth of said combined analog signals.

15. The receiver of claim 7, wherein said analog to digital converter digitally converts said analog signals at said different RF frequency bands at a sampling rate selected so that said different RF frequency bands fold back to substantially non-overlapping portions of a Nyquist zone as said analog signals are digitally converted.

16. The receiver of claim 15, wherein said non-overlapping portions of said Nyquist zone represent the Nyquist bandwidth provided by said digitally converting to reproduce said RF analog signals in the digital domain.

17. The receiver of claim 15, wherein said selected sampling rate is at least twice a signal bandwidth of said combined analog signals, so that said signal bandwidth rotates periodically about itself at frequency multiples of one-half said selected sampling frequency back to a first Nyquist zone in the digital domain from about 0 Hz to said selected sampling rate.

18. The receiver of claim 17, wherein said selected sampling rate is at least twice a highest frequency component of said signal bandwidth so that information within said analog signals carried by said signal bandwidth are reproduced in the digital domain.

19. The receiver of claim 15, wherein said selected sampling rate is at least twice the signal bandwidth of said combined analog signals.

20. The receiver of claim 7, wherein said analog to digital converter digitally converts said analog signals at said different RF frequency bands at a sampling rate selected so that a signal bandwidth of said combined analog signals and a mirror image of said signal bandwidth periodically repeats at frequency intervals corresponding to said selected sampling rate.

* * * * *